US008730214B2

(12) United States Patent
Kim et al.

(10) Patent No.: US 8,730,214 B2

(45) Date of Patent: May 20, 2014

(54) COG PANEL SYSTEM ARRANGEMENT

(75) Inventors: Kyung Chun Kim, Daejeon-si (KR); An Young Kim, Daejeon-si (KR); Joon Ho Na, Daejeon-si (KR); Dae Seong Kim, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 203 days.

(21) Appl. No.: 12/991,553

(22) PCT Filed: Apr. 29, 2009

(86) PCT No.: PCT/KR2009/002234

§ 371 (c)(1), (2), (4) Date: Nov. 8, 2010

(87) PCT Pub. No.: WO2009/142399

PCT Pub. Date: Nov. 26, 2009

(65) Prior Publication Data

US 2011/0057968 A1 Mar. 10, 2011

(30) Foreign Application Priority Data

May 22, 2008 (KR) ........................ 10-2008-0047335

(51) Int. Cl.
*G06F 3/038* (2013.01)
*G02F 1/1343* (2006.01)

(52) U.S. Cl.
USPC .......................................... 345/204; 349/139

(58) Field of Classification Search
None
See application file for complete search history.

(56) References Cited

U.S. PATENT DOCUMENTS

| | | | | |
|---|---|---|---|---|
| 7,667,677 | B2 * | 2/2010 | Yi et al. | 345/87 |
| 2004/0085281 | A1 | 5/2004 | Chung et al. | |
| 2004/0135956 | A1 * | 7/2004 | Kim et al. | 349/148 |
| 2006/0125743 | A1 | 6/2006 | Lee et al. | |
| 2007/0046599 | A1 | 3/2007 | Kim et al. | |
| 2007/0279351 | A1 * | 12/2007 | Im | 345/87 |

FOREIGN PATENT DOCUMENTS

| | | |
|---|---|---|
| CN | 1714386 | 12/2005 |
| CN | 1783199 | 6/2006 |
| JP | 6-224695 | 8/1994 |
| JP | 10-239655 | 9/1998 |
| JP | 2943322 | 6/1999 |
| JP | 2003-5719 | 1/2003 |
| JP | 2003-15613 | 1/2003 |

(Continued)

OTHER PUBLICATIONS

PCT Written Opinion of the International Searching Authority, Application No. PCT/KR2009/002234, dated Dec. 23, 2009.

(Continued)

*Primary Examiner* — Quan-Zhen Wang
*Assistant Examiner* — Chad Dicke
(74) *Attorney, Agent, or Firm* — Kile Park Reed & Houtteman PLLC

(57) ABSTRACT

Provided is a COG panel system capable of minimizing a block dim effect by considering a relationship among a plurality of chips. The COG panel system includes: an FPC which supplies at least two power supply voltages having a constant voltage level; a plurality of SDIs which are commonly supplied with a bypass power supply voltage from the FPC and generate respective parts of a plurality of consecutive LCD driving signals required for an arbitrary one line of an LCD; and at least one block dim correction resistance.

2 Claims, 5 Drawing Sheets

(56) References Cited

FOREIGN PATENT DOCUMENTS

| | | | |
|---|---|---|---|
| JP | 2004-70317 | | 3/2004 |
| JP | 2004-109163 | | 4/2004 |
| JP | 2004-109163 | A | 4/2004 |
| JP | 2006-18154 | | 1/2006 |
| KR | 1999-024957 | | 4/1999 |
| KR | 100268304 | B1 | 7/2000 |
| KR | 2001-0103390 | | 11/2001 |
| KR | 2001-0103990 | | 11/2001 |
| KR | 1010010103390 | A | 11/2001 |
| KR | 1020070027860 | A | 3/2007 |
| TW | 525113 | | 3/2003 |
| TW | 525114 | | 3/2003 |

OTHER PUBLICATIONS

PCT International Search Report, Application No. PCT/KR2009-002234, dated Dec. 23, 2009.

* cited by examiner

COG PANEL SYSTEM ARRANGEMENT

BACKGROUND OF THE INVENTION

1. Field of the Invention

The present invention relates to a chip-on-glass (COG) panel system, and more particularly, to a COG panel system capable of minimizing a block dim effect by considering a relationship among a plurality of chips.

2. Description of the Related Art

In a case where a plurality of chips arrayed on the same printed circuit board (PCB) are operated by using a common power supply, a source of the power supply and pads formed in the chips are connected through metal lines. According to the connection schemes, there are a tape carrier package (TCP) mounting scheme using a tape automated boding (TAB) technique, a chip-on-film (COF) mounting scheme having a flexibility better than that of the TCP mounting scheme, and a chip on glass (COG) mounting scheme using a technique of directly connecting on a glass substrate by using a bump technique. In the COG mounting scheme, films used in the TCP and COF mounting schemes are not used, so that cost can be reduced. However, the COG mounting scheme has a problem in that voltage drop occurs due to specific resistances of signal lines or power supply lines which are constructed with metal lines.

An LCD driver IC (liquid crystal display driver integrated circuit) which is operated in response to a gamma reference voltage applies a data driver signal to an LCD panel. At least two LCD driver ICs are connected to one LCD panel. The gamma reference voltages applied to the LCD driver ICs are varied with the LCD driver ICs. In general, brightness difference among data lines driven by the LCD driver ICs may occur on an LCD screen, which is called a 'block dim effect. The block dim effect may also occur due to a very small potential difference among the power supply voltage lines connected to the LCD driver ICs. Conventionally, in order to solve the block dim effect, all input resistances of the power supply voltage lines as seen from the LCD driver ICs have been designed to be the same.

FIG. 1 is a view illustrating a configuration of a conventional COG panel system where resistances of power supply voltage lines connected to chips are considered.

Referring to FIG. 1, in the conventional COG panel system 100, two power supply voltage lines VDD_bypass and VDD connected to a flexible printed circuit (FPC) 130 are connected to two chips 110 and 120. The two power supply voltage lines VDD_bypass and VDD have the same voltage level. The bypass power supply voltage line VDD_bypass is connected through a first chip 110 to a second chip 120. The correction power supply voltage line VDD is connected to only the first chip 110.

Since the bypass power supply voltage line VDD_bypass is connected through the first chip 110 to the second chip 120, the input resistance RI2 of the bypass power supply voltage line VDD_bypass as seen from the second chip 120 is a sum of a specific resistance RB1 of the line from the FPC 130 to the first chip 110, an internal specific resistance RB_i of the first chip 110, and a specific resistance RB2 of the line from the first chip 110 to the second chip 120. The input resistance RI2 is expressed by Equation 1.

$$RI2 = RB1 + RB\_i + RB2 \quad \text{[Equation 1]}$$

The input resistance RI1 of the bypass power supply voltage line VDD_bypass as seen from the first chip 110 is only the specific resistance RB1 of the metal line from the FPC 130 to the first chip 110. Therefore, the input resistance RI1 of the bypass power supply voltage line VDD_bypass as seen from the first chip 110 is different from the input resistance RI2 of the bypass power supply voltage line VDD_bypass as seen from the second chip 120. In order to match the input resistances RI1 and RI2, the correction power supply voltage line VDD is added to be connected through a correction resistance R1 to the first chip 110.

The correction resistance R1 in the correction power supply voltage line VDD as seen from a first output terminal OUT1 of the first chip 110 is designed to be equal to the resistance RI2 in the bypass power supply voltage line VDD_bypass as seen from a first output terminal OUT1 of the second chip 120. The correction resistance R1 is expressed by Equation 2.

$$R1 = RI2 = RB1 + RB\_i + RB2 \quad \text{[Equation 2]}$$

However, the block dim effect cannot be minimized by simply matching the input resistances of the power supply voltage lines as seen from the chips. In order to minimize the block dim effect, a relationship among signals output from a plurality of the chips needs to be considered.

Referring to FIG. 1, in the conventional correction scheme, only the specific resistance of the metal line in the bypass power supply voltage line VDD_bypass from the FPC to the first chip 110, the specific resistance of the internal routing line of the first chip 110, and the specific resistance of the metal line between the first chip 110 and the second chip 120 are considered. Namely, the resistances of the power supply voltage lines as seen from the first output terminal OUT1 of the first chip 110 and the first output terminal OUT1 of the second chip 120 are to be matched.

However, the most dominant block dim effect can be observed between a 480-th output terminal OUT480 that is the last output terminal of the first chip 110 and the first output terminal OUT1 of the second chip 120 that is closest to the 480-th output terminal OUT480. Therefore, the conventional correction scheme which does not consider the fact has a problem in minimizing the block dim effect.

SUMMARY OF THE INVENTION

The present invention provides a COG panel system capable of minimizing a block dim effect by considering a relationship among a plurality of chips.

According to an aspect of the present invention, there is provided a COG panel system, comprising: an FPC which supplies at least two power supply voltages having a constant voltage level; a plurality of SDIs which are commonly supplied with a bypass power supply voltage from the FPC and generate respective parts of a plurality of consecutive LCD driving signals required for an arbitrary one line of an LCD; and at least one block dim correction resistance, wherein a correction power supply voltage other than the bypass power supply voltage is applied from the FPC through the block dim correction resistance to the SDI, and wherein a total specific resistance of a line for the correction power supply voltage and the block dim correction resistance as seen from an output terminal of a foregoing SDI through which a last LCD driving signal among the foregoing LCD driving signals of the foregoing SDI is output is equal to a total specific resistance of a line for the bypass power supply voltage as seen from an output terminal of a following SDI through which a first LCD driving signal among the following LCD driving signals of the following SDI is output, or the total resistance of the specific resistance of the line for the bypass power supply voltage as seen from the following SDI through the first LCD driving signal among the following LCD driving signals of the following SDI is output is equal to the resistance of the block dim correction resistance.

According to another aspect of the present invention, there is provided a COG panel system, comprising: an FPC which supplies first and second power supply voltages having a constant voltage level; and two SDIs which generate respective parts of a plurality of consecutive LCD driving signals required for an arbitrary one line of an LCD, wherein the first power supply voltage is supplied to an output terminal of a first SDI through a last LCD driving signal among the LCD driving signals of the first SDI is output, and a second power supply voltage is supplied to an output terminal of a second SDI through a first LCD driving signal among the LCD driving signals of the second SDI is output, and wherein a specific resistance for the first power supply voltage as seen from the output terminal of the first SDI through the last LCD driving signal of the first SDI is output is equal to a specific resistance for the second power supply voltage as seen from the output terminal of the second SDI through the first LCD driving signal of the second SDI is output.

According to another aspect of the present invention, there is provided a COG panel system, comprising: an FPC which supplies a power supply voltage having a constant voltage level; and two SDIs which generate respective parts of a plurality of consecutive LCD driving signals required for an arbitrary one line of an LCD, wherein a line for a power supply voltage supplied from the FPC is branched into first and second branched power supply voltage line, wherein the first branched power supply voltage line is connected to an output terminal of a first SDI through which a last LCD driving signal among the LCD driving signals of the first SDI is output, and the second branched power supply voltage line is connected to an output terminal of a second SDI through which a first LCD driving signal among the LCD driving signals of the second SDI is output, and wherein a specific resistance for the first branched power supply voltage line as seen from the output terminal through the last LCD driving signal of the first SDI is output is equal to a specific resistance for the second branched power supply voltage line as seen from the output terminal through the first LCD driving signal of the second SDI is output.

According to the present invention, it is possible to minimize a block dim effect which occurs on an LCD panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Firstly, a block dim effect occurring on an LCD panel will be described. Next, embodiments of the present invention for minimizing the block dim effect will be described.

A source driving integrated circuit (hereinafter, refer to as an SDI) generates a plurality of LCD driving signals. A quality of a video signal played in an LCD panel is determined based on voltage levels of the LCD driving signals. As a size of the LCD panel is increased, the entire LCD panel cannot be driven by using a single SDI. Therefore, the number of SDIs is increased to drive the LCD panel. For this reason, in order to obtain a good image quality of the LCD panel, there is a need to consider a relationship between a last LCD driving signal generated by an SDI and first LCD driving signal of a SDI adjacent to the SDI as well as a relationship among the LCD driving signals generated by each of the SDIs As seen in the horizontal direction of a LCD panel, consecutively arrayed pixels are driven by a plurality of LCD driving signals output from an SDI and a plurality of LCD driving signals output from an adjacent SDI. Assuming that consecutive LCD driving signals output from three SDIs are needed to drive the entire horizontal pixels of the LCD panel, the block dim effect is closely related to the last LCD driving signal among the LCD driving signals output from the first SDI and the first LCD driving signal among the LCD driving signals output from the second SDI.

In a case where the same voltage levels are supplied to a circuit for generating the LCD driving signals by the power supply unit, the voltage levels of the LCD driving signals are also the same as a designed value. However, if the voltage level supplied to the first SDI by the power supply unit is different from the voltage level supplied to the second SDI by the power supply unit, the last LCD driving signal among the LCD driving signals output from the first SDI and the first LCD driving signal among the LCD driving signals output from the second SDI are generated by the power supply unit having different voltage levels. A large difference in the values of the following LCD driving signals occurs. In this case, the block dim effect occurs on the LCD screen.

In order to minimize the block dim effect, the present invention provides a layout pattern capable of optimizing input resistances of power supply voltage lines as seen from the SDIs by considering a relationship among output signals of the consecutively arrayed SDIs.

Hereinafter, embodiments of the present invention will be described with reference to the accompanying drawings.

Figure 1:
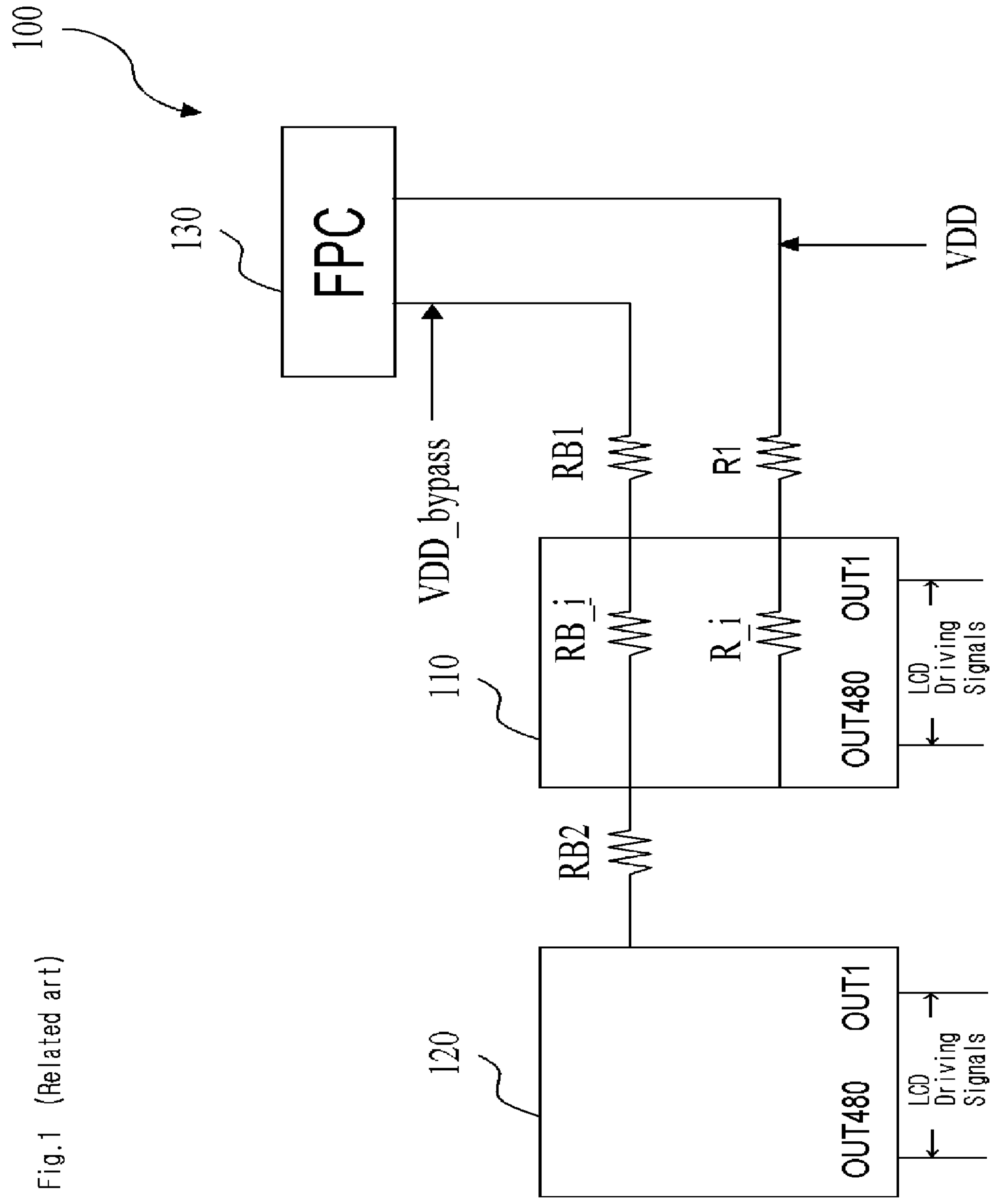
Fig.1 (Related art)
FIG. 1 is a view illustrating a configuration of a COG panel system where resistances of power supply voltage lines connected to chips are considered.
Figure 2:
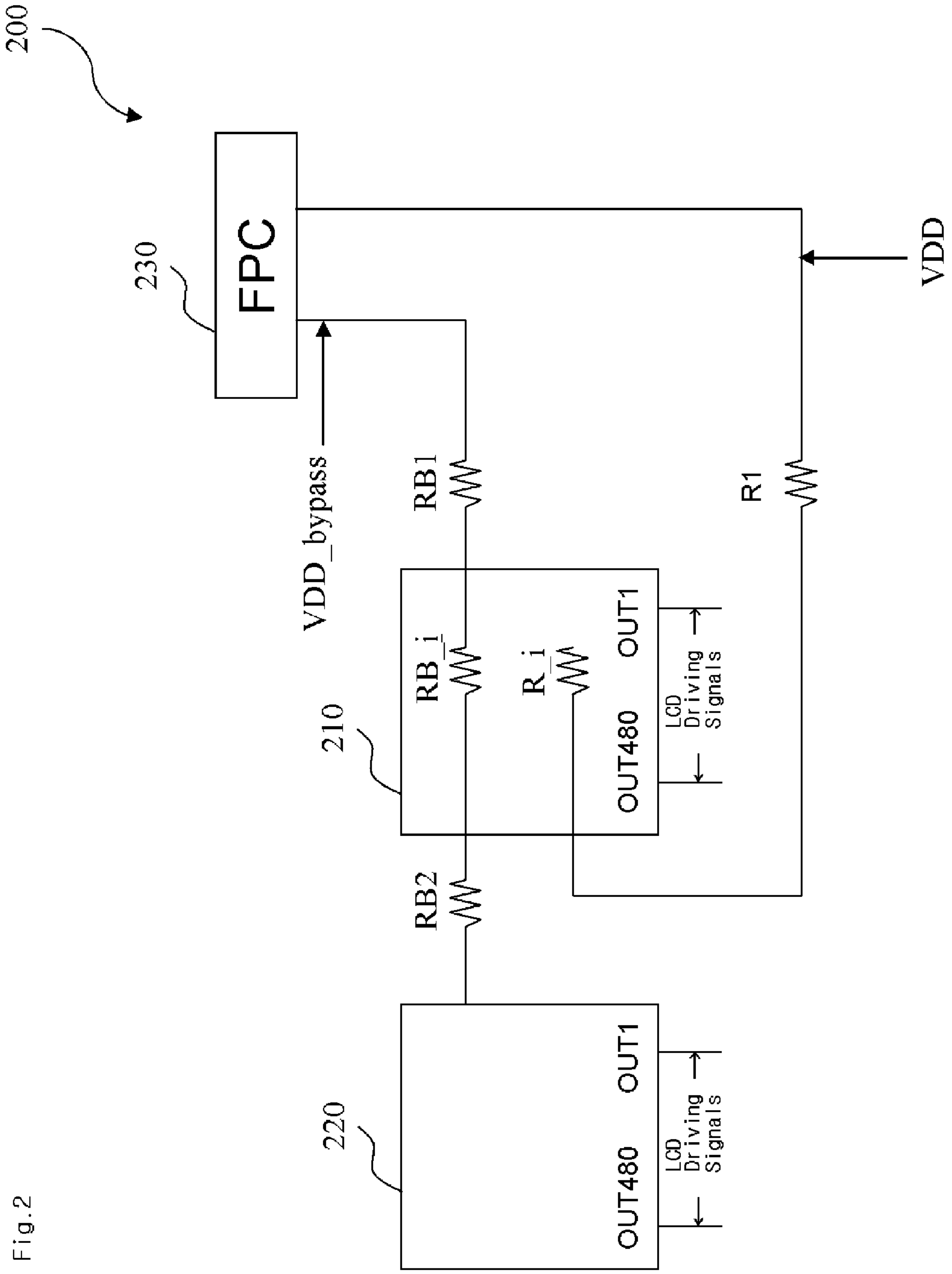
FIG. 2 is a view illustrating a configuration of a COG panel system according to a first embodiment of the present invention.

FIG. 2 is a view illustrating a configuration of a COG panel system according to a first embodiment of the present invention.

Referring to FIG. 2, the COG panel system 200 according to the embodiment includes an FPC 230 which supplies a bypass power supply voltage VDD_bypass and a correction power supply voltage VDD having a voltage level the same as that of the bypass power supply voltage VDD_bypass, two SDIs 210 and 220 which generates respective portions of a plurality of consecutive LCD driving signals required for an arbitrary one line of an LCD and to which the bypass power supply voltage VDD_bypass is commonly supplied from the FPC 230, and a block dim correction resistance R1.

A correction power supply voltage VDD is applied to the first SDI 210 through the block dim correction resistance R1. As expressed in Equation 3, a block dim correction resistance R1 as seen from the output terminal OUT480 of the first SDI 210 through which the last LCD driving signal among the foregoing LCD driving signals of the first SDI 210 is output is equal to a specific resistance RB1+RB_i+RB2 of a line for the bypass power supply voltage VDD_bypass which is supplied from the FPC 230 through the first SDI 210 to the second SDI 220 as seen from the output terminal OUT1 of the second SDI 220 through which the first LCD driving signal among the following LCD driving signals of the second SDI 220 is output.

$$R1=RB1+RB\_i+RB2 \quad \text{[Equation 3]}$$

Figure 3:
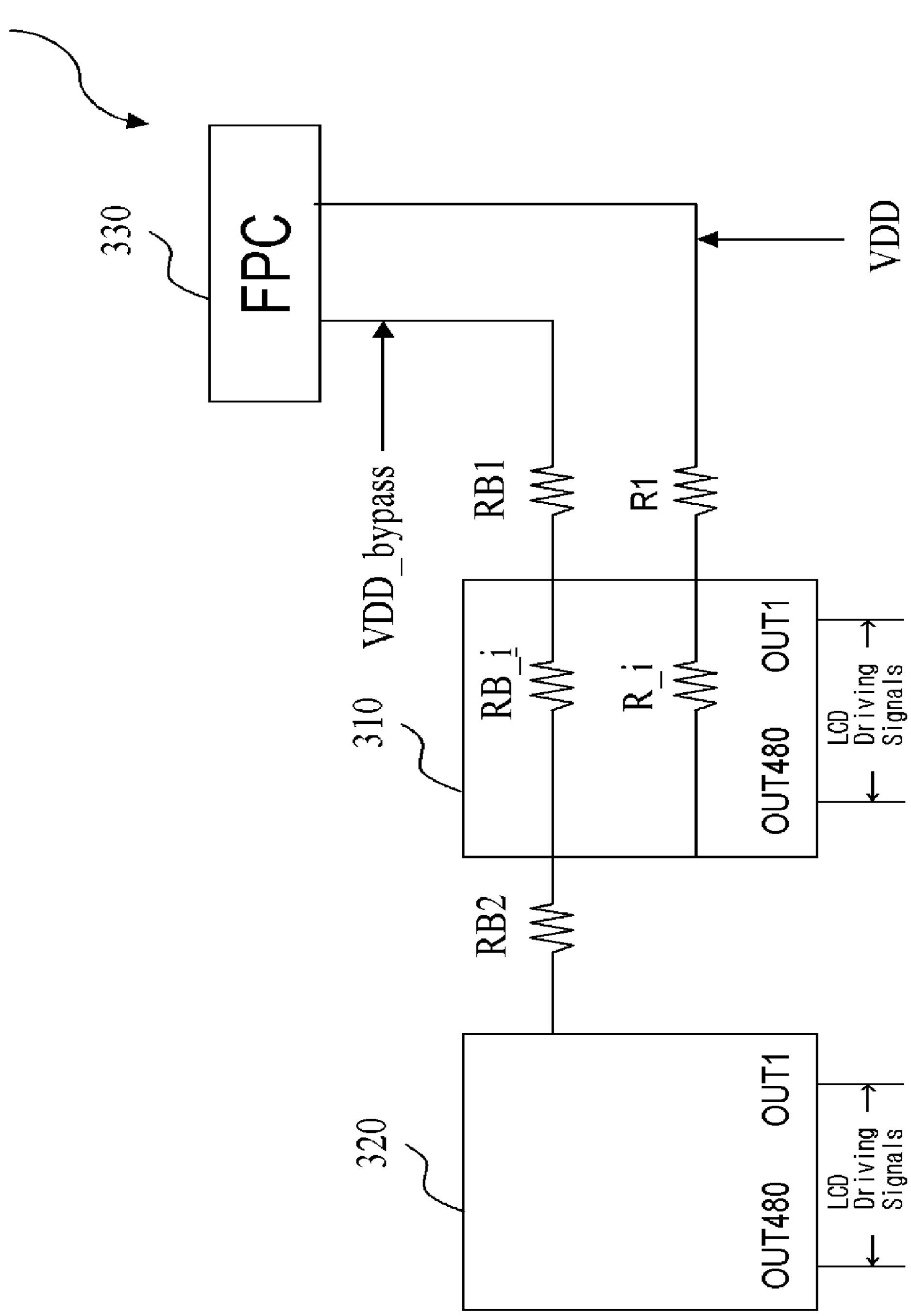
FIG. 3 is a view illustrating a configuration of a COG panel system according to a second embodiment of the present invention.

FIG. 3 is a view illustrating a configuration of a COG panel system according to a second embodiment of the present invention.

Referring to FIG. 3, the COG panel system 300 according to the embodiment includes an FPC 330 which supplies a bypass power supply voltage VDD_bypass and a correction power supply voltage VDD having a voltage level the same as that of the bypass power supply voltage VDD_bypass, two SDIs 310 and 320 which generates respective portions of consecutive LCD driving signals required for an arbitrary one line of an LCD and to which the bypass power supply voltage VDD_bypass is commonly supplied from the FPC 330, and a block dim correction resistance R1.

The correction power supply voltage VDD is connected through the block dim correction resistance R1 to the output terminal OUT1 of the first SDI 310, through which the first driving signal among the foregoing LCD driving signals is output from the first SDI 310. As expressed in Equation 4, a block dim correction resistance R1 is equal to a resistance RB1+RB_i+RB2−R_i obtained by subtracting a specific resistance R_i of a line for the correction power supply voltage VDD which is disposed between the output terminal OUT1 of the first SDI 310 through which the first LCD driving signal of the first SDI 310 is output and the output terminal OUT480 of the first SDI 310 through which the last LCD driving signal of the first SDI 310 is output from a specific resistance RB1+RB_i+RB2 of a line for the bypass power supply voltage VDD_bypass which is supplied from the FPC 330 through the first SDI 310 to the second SDI 320.

$$R1=RB1+RB\_i+RB2-R\_i \quad \text{[Equation 4]}$$

Figure 4:
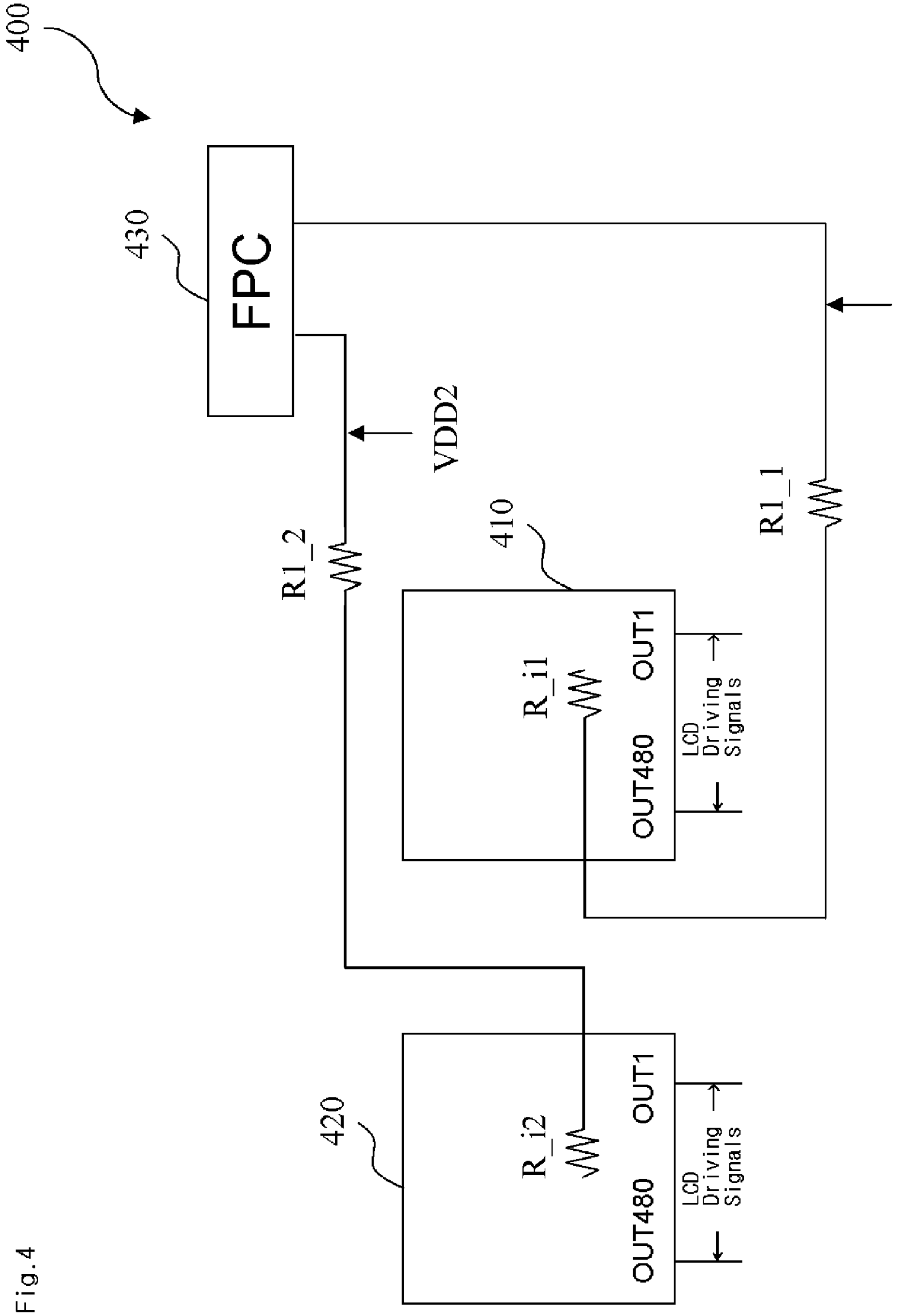
FIG. 4 is a view illustrating a configuration of a COG panel system according to a third embodiment of the present invention.

FIG. 4 is a view illustrating a configuration of a COG panel system according to a third embodiment of the present invention.

Referring to FIG. 4, the COG panel system 400 according to the embodiment includes an FPC 430 which supplies a first power supply voltage VDD1 and a second power supply voltage VDD2 having a constant voltage level; and two SDIs 410 and 420 which generates respective portions of a plurality of consecutive LCD driving signals required for an arbitrary one line of an LCD.

The first power supply voltage VDD1 is supplied to an output terminal OUT480 of the first SDI 410, through which the last LCD driving signal among the LCD driving signals of the first SDI 410 is output, and the second power supply voltage VDD2 is supplied to an output terminal OUT1 of the second SDI 420, through which the first LCD driving signal among the LCD driving signals of the second SDI 420 is output. As expressed in Equation 5, a specific resistance R1_1 of the first SDI 410 as seen from the output terminal OUT480 through which the last LCD driving signal of the first SDI 410 is output is equal to a specific resistance R1_2 of the second power supply voltage VDD2 as seen from the output terminal OUT1 through which the first LCD driving signal of the second SDI 420 is output.

$$R1\_1=R1\_2 \quad \text{[Equation 5]}$$

Figure 5:
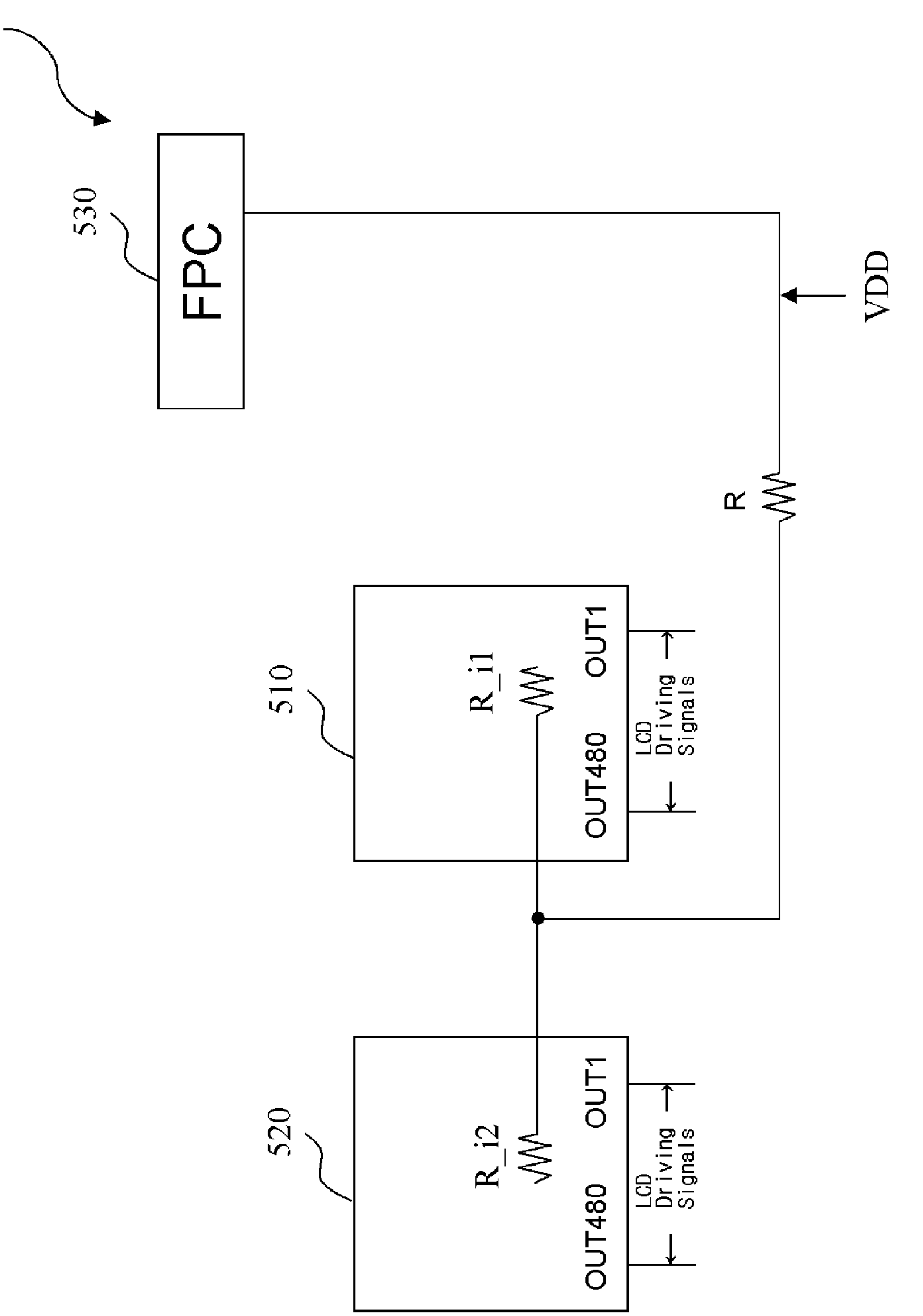
FIG. 5 is a view illustrating a configuration of a COG panel system according to a fourth embodiment of the present invention.

FIG. 5 is a view illustrating a configuration of a COG panel system according to a fourth embodiment of the present invention.

Referring to FIG. 5, the COG panel system 500 according to the embodiment includes an FPC 530 which supplies a power supply voltage VDD having a constant voltage level; and two SDIs 510 and 520 which generates respective portions of a plurality of consecutive LCD driving signals required for an arbitrary one line of an LCD.

A line for the power supply voltage VDD is branched into first and second branched power supply voltage lines. The first branched power supply voltage line is connected to an output terminal OUT480 of the first SDI 510, through which the last LCD driving signal among the LCD driving signals of the first SDI 510 is output. The second branched power supply voltage line is connected to an output terminal OUT1 of the second SDI 520, through which the first LCD driving signal among the LCD driving signals of the second SDI 520 is output. As expressed in Equation 6, a specific resistance R+R_i1 for the first branched power supply voltage line connected to the first SDI 510 as seen from the output terminal OUT480 of the first SDI 510 through which the last LCD driving signal among the LCD driving signals of the first SDI 510 is output is equal to a specific resistance R+R_i2 for the second branched power supply voltage line connected to the second SDI 520 as seen from the output terminal OUT1 of the second SDI 520 through which the first LCD driving signal among the LCD driving signals of the second SDI 520 is output.

$$R+R\_i1=R+R\_i2 \quad \text{[Equation 6]}$$

According to a COG panel system of the present invention, power supply voltages having the same voltage level are supplied to an output terminal of a foregoing SDI through which the last LCD driving signal among the LCD driving signals allocated to the foregoing SDI is output and an output terminal of a following SDI through the first LCD driving signal among the LCD driving signals allocated to the following SDI is output to follow the last LCD driving signal, so that it is possible to minimize a block dim effect.

While the present invention has been shown and described in connection with the exemplary embodiments, it will be apparent to those skilled in the art that modifications and variations can be made without departing from the spirit and scope of the invention as defined by the appended claims.

What is claimed is:

1. A COG panel system, comprising:

an FPC configured to supply a bypass power supply voltage and a correction power supply voltage having a constant voltage level;

a plurality of SDIs comprising a foregoing SDI and a following SDI which are commonly supplied with the bypass power supply voltage from the FPC and are configured to generate respective portions of a plurality of consecutive LCD driving signals required for an arbitrary one line of an LCD; and at least one block dim correction resistance to the foregoing SDI, wherein the correction power supply voltage is applied from the FPC through the block dim correction resistance to only the foregoing SDI, wherein a total specific resistance of a line for the correction power supply voltage as seen from an output terminal of the foregoing SDI through which a last LCD driving signal among the foregoing LCD driving signals of the foregoing SDI is output is equal to a total specific resistance of a line for the bypass power supply voltage as seen from an output terminal of the following SDI through which a first LCD driving signal among the following LCD driving signals of the following SDI is output, and wherein the correction power supply voltage is supplied through the block dim correction resistance and then supplied to the foregoing SDI first at the output terminal through which the last LCD driving signal among the foregoing LCD driving signals of the foregoing SDI is output.

2. A COG panel system, comprising:

an FPC configured to supply a first power supply voltage and a second power supply voltage having a constant voltage level; and a plurality of SDIs comprising a first SDI and a second SDI which are configured to generate respective portions of a plurality of consecutive LCD driving signals required for an arbitrary one line of an LCD, wherein the first power supply voltage is only supplied to the first SDI and is supplied to the first SDI first at an output terminal through which a last LCD driving signal among the LCD driving signals of the first SDI is output, wherein the second power supply voltage is only supplied to the second SDI and is supplied to the second SDI first at an output terminal through which a first LCD driving signal among the LCD driving signals of the second SDI is output, and wherein a specific resistance for the first power supply voltage as seen from the output terminal of the first SDI through which the last LCD driving signal of the first SDI is output is equal to a specific resistance for the second power supply voltage as seen from the output terminal of the second SDI through which the first LCD driving signal of the second SDI is output.

* * * * *